(12) United States Patent
Breedvelt-Schouten et al.

(10) Patent No.: US 10,821,886 B1
(45) Date of Patent: Nov. 3, 2020

(54) SENSOR-BASED ACKNOWLEDGMENTS BETWEEN ROAD TRAFFIC PARTICIPANTS

(71) Applicant: International Business Machines Corporation, Armonk, NY (US)

(72) Inventors: Ilse M. Breedvelt-Schouten, Manotick (CA); John A. Lyons, Ottawa (CA); Jeffrey A. Kusnitz, Campbell, CA (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/539,583

(22) Filed: Aug. 13, 2019

(51) Int. Cl.
| | | |
|---|---|---|
| *B60Q 1/50* | (2006.01) | |
| *B60K 35/00* | (2006.01) | |
| *B60Q 1/00* | (2006.01) | |
| *G06F 3/01* | (2006.01) | |
| *G06K 9/00* | (2006.01) | |

(52) U.S. Cl.
CPC ............... *B60Q 1/50* (2013.01); *B60K 35/00* (2013.01); *B60Q 1/0023* (2013.01); *G06F 3/013* (2013.01); *G06K 9/00845* (2013.01); *B60K 2370/178* (2019.05); *B60K 2370/797* (2019.05)

(58) Field of Classification Search
CPC combination set(s) only.
See application file for complete search history.

(56) References Cited

U.S. PATENT DOCUMENTS

| | | | |
|---|---|---|---|
| 9,421,909 | B2 | 8/2016 | Strickland |
| 9,969,326 | B2 | 5/2018 | Ross |
| 2007/0273611 | A1 | 11/2007 | Torch |
| 2018/0264940 | A1* | 9/2018 | Torii ..................... G08G 1/166 |
| 2018/0276986 | A1 | 9/2018 | Delp |
| 2019/0147264 | A1* | 5/2019 | Aoi ................... G06K 9/00791 |
| | | | 382/103 |

FOREIGN PATENT DOCUMENTS

EP     3082120 A1     10/2016

OTHER PUBLICATIONS

"This is Eye Tracking", Tobii AB, © 2019 Tobii AB, 3 pages, <https://www.tobii.com/group/about/this-is-eye-tracking/>.

(Continued)

*Primary Examiner* — Thomas S McCormack
(74) *Attorney, Agent, or Firm* — Edward Li

(57) ABSTRACT

A computer-implemented method, a computer program product, and a computer system for sensor-based acknowledgments between road traffic participants. One or more cameras on a vehicle identify a gaze direction of a driver of the vehicle. The one or more cameras identify a focused eye state of the driver. One or more object recognition sensors on the vehicle identify objects around the vehicle. The computer system determines whether an object is identified in the gaze direction. In response to the object being identified in the gaze direction, the computer system instructs a light indicator to emit light in a direction toward the object. The light indicator notifies a traffic participant associated with the object that the driver has seen the object.

18 Claims, 5 Drawing Sheets

(56) References Cited

OTHER PUBLICATIONS

Habibovic et al., "Communicating Intent of Automated Vehicles to Pedestrians", Frontiers in Psychology, Aug. 2018 | vol. 9 | Article 1336, pp. 1-17, <https://www.ncbi.nlm.nih.gov/pmc/articles/PMC6090516/>.

Ji et al., "Real-Time Nonintrusive Monitoring and Prediction of Driver Fatigue", IEEE Transactions on Vehicular Technology, vol. 53, No. 4, Jul. 2004, pp. 1052-1068, <https://ieeexplore.ieee.org/abstract/document/1317209>.

Mahadevan et al., "Communicating Awareness and Intent in Autonomous Vehicle-Pedestrian Interaction", CHI 2018, Apr. 21-26, 2018, Montréal, QC, Canada, CHI 2018 Paper 429, pp. 1-12, <https://dl.acm.org/citation.cfm?id=3174003>.

Stiefelhagen et al., "Tracking Eyes and Monitoring Eye Gaze", Conference Paper, Proceedings of PUI'97, Jan. 1997, The Robotics Institute Carnegie Mellon University, 4 pages, <https://www.ri.cmu.edu/publications/tracking-eyes-and-monitoring-eye-gaze>.

* cited by examiner

US 10,821,886 B1

SENSOR-BASED ACKNOWLEDGMENTS BETWEEN ROAD TRAFFIC PARTICIPANTS

BACKGROUND

The present invention relates generally to improving road traffic safety, and more particularly to sensor-based acknowledgments between road traffic participants.

Many traffic accidents occur due to lack of acknowledgments between traffic participants. In a first example, when a first driver (or first traffic participant) of a first vehicle and a second driver (or second traffic participant) of a second vehicle see each other approach stop signs at an intersection, both drivers do not know which one approaches first. Under this circumstance, a decision on the next action (i.e., passing the intersection first) depends on human expectation and negotiation. It is not always possible for the both drivers to see faces of each other. Thus, the both drivers may start to pass the intersection simultaneously. Under this circumstance, a traffic accident may occur when the both drivers pass through stop signs and enter the intersection simultaneously. In a second example, when a driver (or first traffic participant) of a vehicle approaches an intersection and plans to make a left turn; at the same time, a cyclist (or second traffic participant) approaches the intersection from the opposite direction and moves straight to pass the intersection. Even though the cyclist has a priority to move straight to pass the intersection first, the cyclist wants to know whether the driver has seen the cyclist in order to avoid a traffic accident. Although the promise of self-driving cars is there, there are still many limitations on the actual implementation of the technology in the short term.

There is a need to acknowledge that a traffic participant has seen the other traffic participant. However, sometimes the traffic participant looks in the direction of the other traffic participant, but the traffic participant doesn't really see the other traffic participant. Traffic is all about anticipating others' actions. It will be very helpful if traffic participants become more aware of what others see instead of just looking in the direction of the others.

Many traffic participants either use their hands to signal or just wait for a long time until they see other parties take actions. This approach causes confusion. Eye contact in traffic can work; however, a stare of a traffic participant is not the same as actually seeing and acknowledging the other traffic participant, so that the stare can be misinterpreted and thus result in a traffic accident.

SUMMARY

In one aspect, a computer-implemented method is provided. The computer-implemented method includes instructing, by a computer system on a vehicle, one or more cameras on a vehicle to identify a gaze direction of a driver of the vehicle. The computer-implemented method further includes instructing, by the computer system, the one or more cameras to identify a focused eye state of the driver. The computer-implemented method further includes instructing, by the computer system, one or more object recognition sensors on the vehicle to identify objects around the vehicle. The computer-implemented method further includes determining, by the computer system, whether an object is identified in the gaze direction. The computer-implemented method further includes instructing, by the computer system, a light indicator to emit light in a direction toward the object, in response to the object being identified in the gaze direction. In the computer-implemented method, the light indicator notifies a traffic participant associated with the object that the driver has seen the object.

In another aspect, a computer program product is provided. The computer program product comprising one or more computer-readable tangible storage devices and program instructions stored on at least one of the one or more computer-readable tangible storage devices. The program instructions are executable to: instruct, by a computer system on a vehicle, one or more cameras on a vehicle to identify a gaze direction of a driver of the vehicle; instruct, by the computer system, the one or more cameras to identify a focused eye state of the driver; instruct, by the computer system, one or more object recognition sensors on the vehicle to identify objects around the vehicle; determine, by the computer system, whether an object is identified in the gaze direction; and instruct, by the computer system, a light indicator to emit light in a direction toward the object, in response to the object being identified in the gaze direction. The light indicator notifies a traffic participant associated with the object that the driver has seen the object.

In yet another aspect, a computer system is provided. The computer system comprises one or more processors, one or more computer readable tangible storage devices, and program instructions stored on at least one of the one or more computer readable tangible storage devices for execution by at least one of the one or more processors. The program instructions are executable to instruct, by a computer system on a vehicle, one or more cameras on a vehicle to identify a gaze direction of a driver of the vehicle. The program instructions are further executable to instruct, by the computer system, the one or more cameras to identify a focused eye state of the driver. The program instructions are further executable to instruct, by the computer system, one or more sensors object recognition on the vehicle to identify objects around the vehicle. The program instructions are further executable to determine, by the computer system, whether an object is identified in the gaze direction. The program instructions are further executable to instruct, by the computer system, a light indicator to emit light in a direction toward the object, in response to the object being identified in the gaze direction, wherein the light indicator notifies a traffic participant associated with the object that the driver has seen the object.

DETAILED DESCRIPTION

Embodiments of the present invention disclose a system of sensor-based acknowledgments between traffic participants. The system identifies a direction of the eye focus of a first traffic participant (e.g., a driver of a vehicle), and the system compares the direction of the eye focus to the vehicle's road object identified by sensors. The system comprises one or more specifically placed indicators on the vehicle; one of the light indicators is toward a second traffic participant (e.g., a driver of another vehicle, a cyclist, or pedestrian) and provides an indication that the second traffic participant has been seen by the first traffic participant. The system further monitors whether the first traffic participant gives a gesture and provides a further indication that the second traffic participant has been seen by the first traffic participant and the second traffic participant can go ahead. If the second traffic participant does not see the indication emitted from the indictor in the second traffic participant's direction, the second traffic participant will either know that the first traffic participant has not seen the second traffic participant or is not sure whether the first traffic participant has seen the second traffic participant; therefore, the second traffic participant will need to exercise more caution.

The advantages of the disclosed system are as follows. The traffic participants can get acknowledgments showing that they have been seen, so that less confusion in traffic will occur. The system advances the use of object recognition in road circumstances. The system promotes safe roads. The more vehicles having the system, the better communications between the traffic participants.

Figure 1:
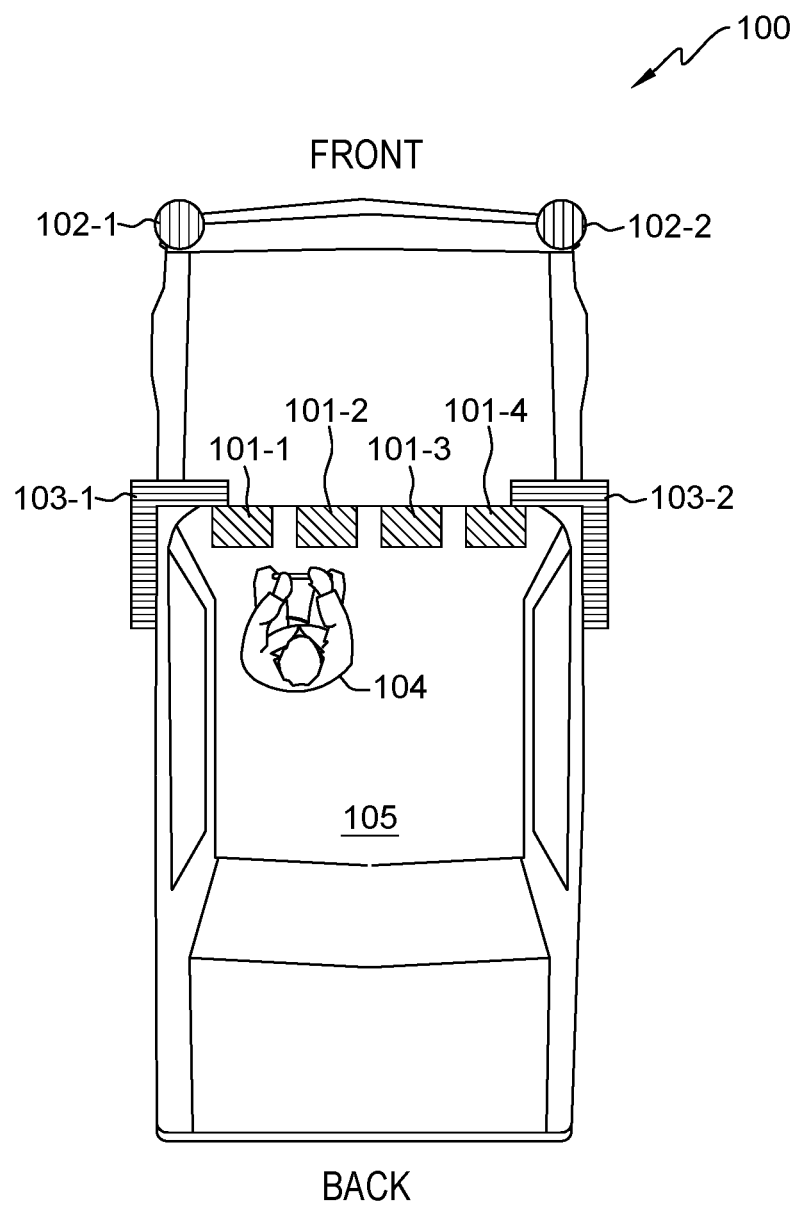
FIG. 1 is a diagram illustrating a system of sensor-based acknowledgments between traffic participants, in accordance with one embodiment of the present invention.

FIG. 1 is a diagram illustrating system 100 of sensor-based acknowledgments between traffic participants, in accordance with one embodiment of the present invention. System 100 included one or more cameras on a vehicle. In the example shown in FIG. 1, system 100 includes cameras 101-1, 101-2, 101-3, and 101-4 on vehicle 105. The one or more cameras may be located on a dashboard of the vehicle or surrounding a backup camera's display. System 100 further includes one or more object recognition sensors on the vehicle. In the example shown in FIG. 1, system 100 includes sensors 102-1 and 102-2 on vehicle 105. The one or more object recognition sensors may be cameras, LIDAR (Light Detection and Ranging), or RADAR (Radio Detection and Ranging). System 100 further includes one or more light indicators located on the top and/or around the vehicle's exterior and can emit light in any directions. In the example shown in FIG. 1, system 100 includes light indicators 103-1 and 103-2.

System 100 further includes a computer system (not shown in FIG. 1) on the vehicle. In system 100, the one or more cameras (such as cameras 101-1, 101-2, 101-3, and 101-4), the one or more object recognition sensors (such as sensors 102-1 and 102-2), and the one or more light indicators (such as light indicators 103-1 and 103-2) communicate with the computer system on vehicle 105. The computer system on vehicle 105 sends computing program instructions to cameras 101-1, 101-2, 101-3, and 101-4, sensors 102-1 and 102-2, and light indicators 103-1 and 103-2. The computer system is described in detail in later paragraphs with reference to FIG. 5.

The one or more cameras detect eyes of a driver of a vehicle, e.g., driver 104 of vehicle 105. Based on detecting the eyes of driver 104 of vehicle 105, the computer system on vehicle 105 determines a gaze direction of driver 104. Sensors 102-1 and 102-2 identify objects (such as vehicles, cyclists, or pedestrians) around vehicle 105.

The computer system of vehicle 105 determines whether an object (such as a vehicle, a cyclist, or a pedestrian) is identified in the gaze direction of driver 104. In response to the object being identified in the gaze direction of driver 104, one of the light indicators 103-1 and 103-2 emits light to notify a second traffic participant (e.g., a driver of the vehicle, the cyclist, or the pedestrian) that the second traffic participant (who is associated with the object) has been seen by the first traffic participant (e.g., driver 104 of vehicle 105). The one of light indicators 103-1 and 103-2 is located toward the object.

In other embodiments, system 100 may be implemented in a motorcycle. One or more cameras are on a driver's helmet and/or inside goggles. One or more object recognition sensors are on the motorcycle. A string of light indicators is around the helmet.

Figure 2:
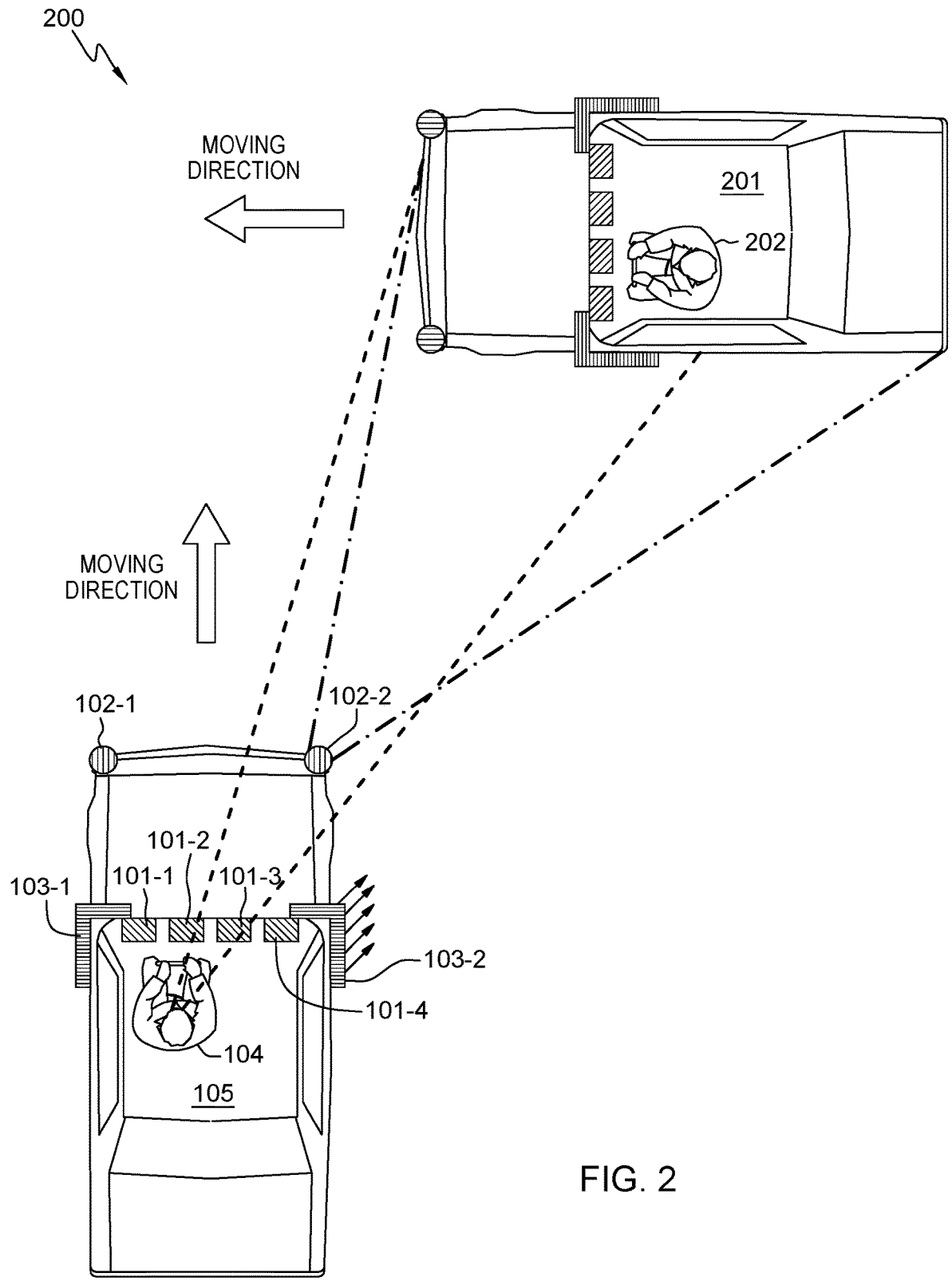
FIG. 2 is a diagram of a first example illustrating how the system shown in FIG. 1 works for acknowledgments between traffic participants in two vehicles, in accordance with one embodiment of the present invention.

FIG. 2 is a diagram of a first example (200) illustrating how system 100 shown in FIG. 1 works for acknowledgments between a first traffic participant (driver 104 of vehicle 105) and a second traffic participant (driver 202 of vehicle 201), in accordance with one embodiment of the present invention.

Vehicle 105 is a first vehicle in FIG. 2 and it has system 100 which is described in detailed in previous paragraphs with reference to FIG. 1. Vehicle 201 is a second vehicle in FIG. 2 and also has the same system (system 100 shown in FIG. 1).

Both vehicle 105 and vehicle 201 approach stop signs at an intersection simultaneously. Cameras 101-1, 101-2, 101-3, and 101-4 on vehicle 105 detect the eyes of driver 104 of vehicle 105. As shown in FIG. 2, driver 104 of vehicle 105 focuses in the direction toward vehicle 201. A gaze direction of driver 104 of vehicle 105 is detected by cameras 101-1, 101-2, 101-3, and 101-4.

Sensors 102-1 and 102-2 detect objects (such as vehicles, cyclists, or pedestrians) around vehicle 105. As shown in FIG. 2, sensor 102-2 identifies one object—vehicle 201. The computer system on vehicle 105 determines whether vehicle 201 is in the gaze direction of driver 104 of vehicle 105. In response to the identified object being in the gaze direction of driver 104, one of the light indicators (light indicator 103-2 which is located toward vehicle 201) emits light to notify driver 202 of vehicle 201 that vehicle 201 has been seen by driver 104 of vehicle 105.

Vehicle 201 has the same system (system 100 shown in FIG. 1) as vehicle 105. One or more cameras on vehicle 201 detect eyes of driver 202 of vehicle 201, and a gaze direction of driver 202 of vehicle 201 is detected by the one or more cameras on vehicle 201. One or more object recognition sensors on vehicle 201 detect objects (such as vehicles, cyclists, or pedestrians) around vehicle 201, and they identify vehicle 105 as an object. A computer system on vehicle 201 determines whether vehicle 105 is in the gaze direction of driver 202 of vehicle 201. In response to vehicle 105 being in the gaze direction of driver 202, one of the light indicators on vehicle 201 emits light to notify driver 104 of vehicle 105 that vehicle 105 has been seen by driver 202 of vehicle 201.

If driver 104 of vehicle 105 gives a gesture to let driver 202 of vehicle 201 pass the stop sign and enter the intersection first. Cameras 101-1, 101-2, 101-3, and 101-4 on vehicle 105 detect the gesture while driver 104 still focuses on vehicle 201, and the one of the light indicators (which is located toward vehicle 201) changes a pattern of emitting light (e.g., changing to an intermittent flashing) to further notify driver 202 of vehicle 201 that vehicle 201 may go first. System 100 on vehicle 201 has the same functions of detecting a gesture of driver 202 and changing a pattern of emitting light.

If both vehicle 105 and vehicle 201 have the same system of sensor-based acknowledgments between traffic participants (i.e., system 100), it will be easier to communicate between traffic participants (driver 104 and driver 202). The signals (e.g., light emitted from the light indicators) from vehicle 105 can be recognized by system 100 on vehicle 201 and vice versa. In other embodiments, by recognizing the signal from vehicle 201, system 100 on vehicle 105 provides a vocal indication (such as "stop" or "go ahead") to driver 104 inside vehicle 105; similarly, by recognizing the signal from vehicle 105, system 100 on vehicle 201 provides a vocal indication (such as "stop" or "go ahead") to driver 202 inside vehicle 201.

Figure 3:
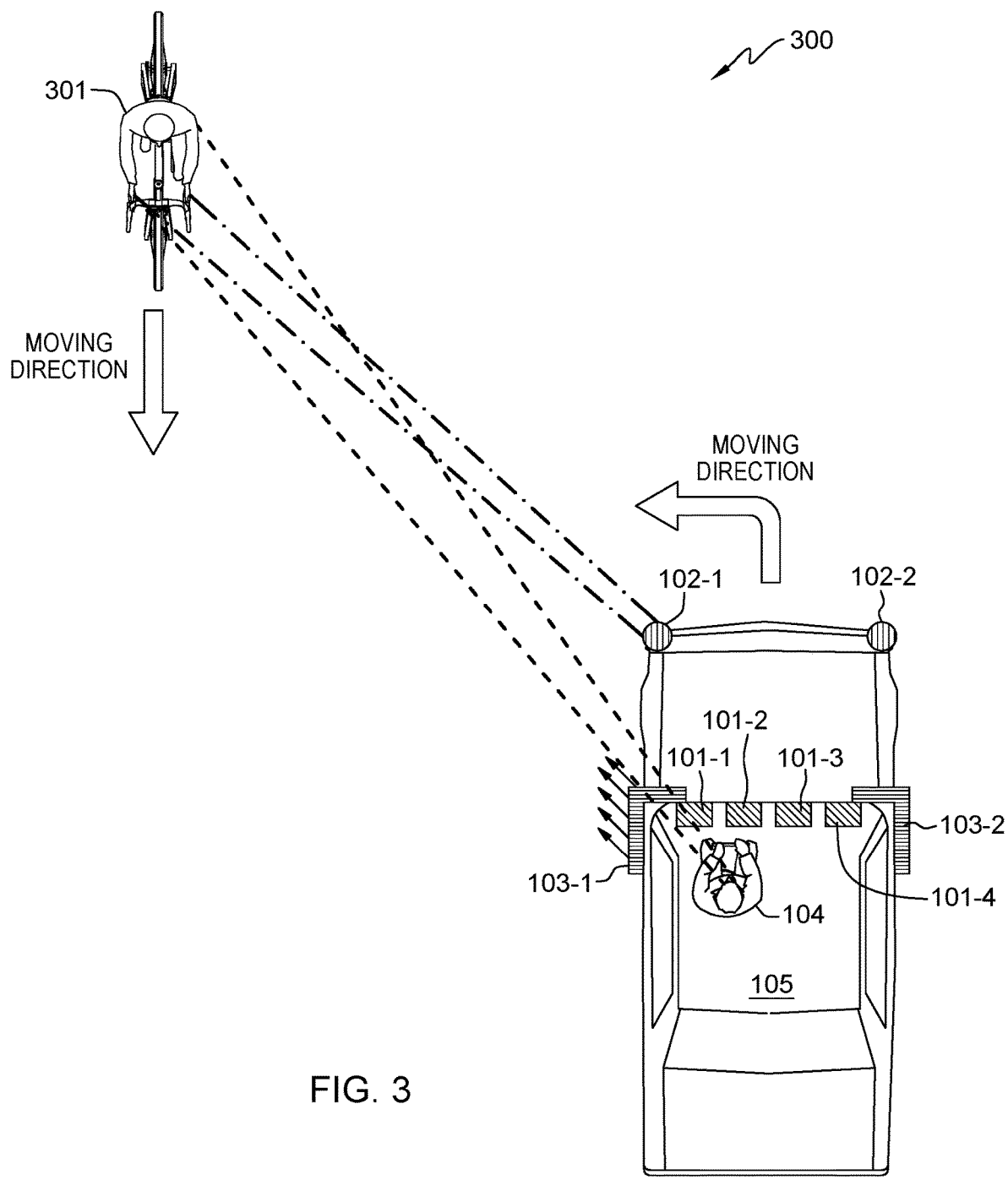
FIG. 3 is a diagram of a second example illustrating how the system shown in FIG. 1 works for acknowledgments between a first traffic participant in a vehicle and a second traffic participant (a cyclist), in accordance with one embodiment of the present invention.

FIG. 3 is a diagram of a second example (300) illustrating how system 100 shown in FIG. 1 works for acknowledgments between a first traffic participant (driver 104 of vehicle 105) and a second traffic participant (cyclist 301), in accordance with one embodiment of the present invention. Both vehicle 105 and cyclist 301 approach an intersection simultaneously. Vehicle 105 is to take a left turn and cyclist 301 is to go straight; under this circumstance, vehicle 105 should yield cyclist 301. However, cyclist 301 is not sure whether driver 104 of vehicle 105 has seen cyclist 301.

Cameras 101-1, 101-2, 101-3, and 101-4 on vehicle 105 detect eyes of driver 104 of vehicle 105. As shown in FIG. 3, driver 104 of vehicle 105 focuses in the direction toward cyclist 301. A gaze direction of driver 104 of vehicle 105 is detected by cameras 101-1, 101-2, 101-3, and 101-4.

Sensors 102-1 and 102-2 on vehicle 105 detect objects around vehicle 105. As shown in FIG. 2, sensor 102-1 identifies one object—cyclist 301. The computer system on vehicle 105 determines whether cyclist 301 is in the gaze direction of driver 104 of vehicle 105. In response to cyclist 301 being in the gaze direction of driver 104, one of the light indicators (light indicator 103-1 which is located toward cyclist 301) emits light to notify cyclist 301 that cyclist 301 has been seen by driver 104 of vehicle 105.

If driver 104 of vehicle 105 gives a gesture to let cyclist 301 know vehicle 105 yields and cyclist 301 can proceed with going straight. Cameras 101-1, 101-2, 101-3, and 101-4 on vehicle 105 detect the gesture and light indicator 103-1 (which is located toward cyclist 301) changes a pattern of emitting light (e.g., changing to an intermittent flashing) to further notify cyclist 301 that cyclist 301 can go straight and vehicle 105 is supposed to yield.

Figure 4:
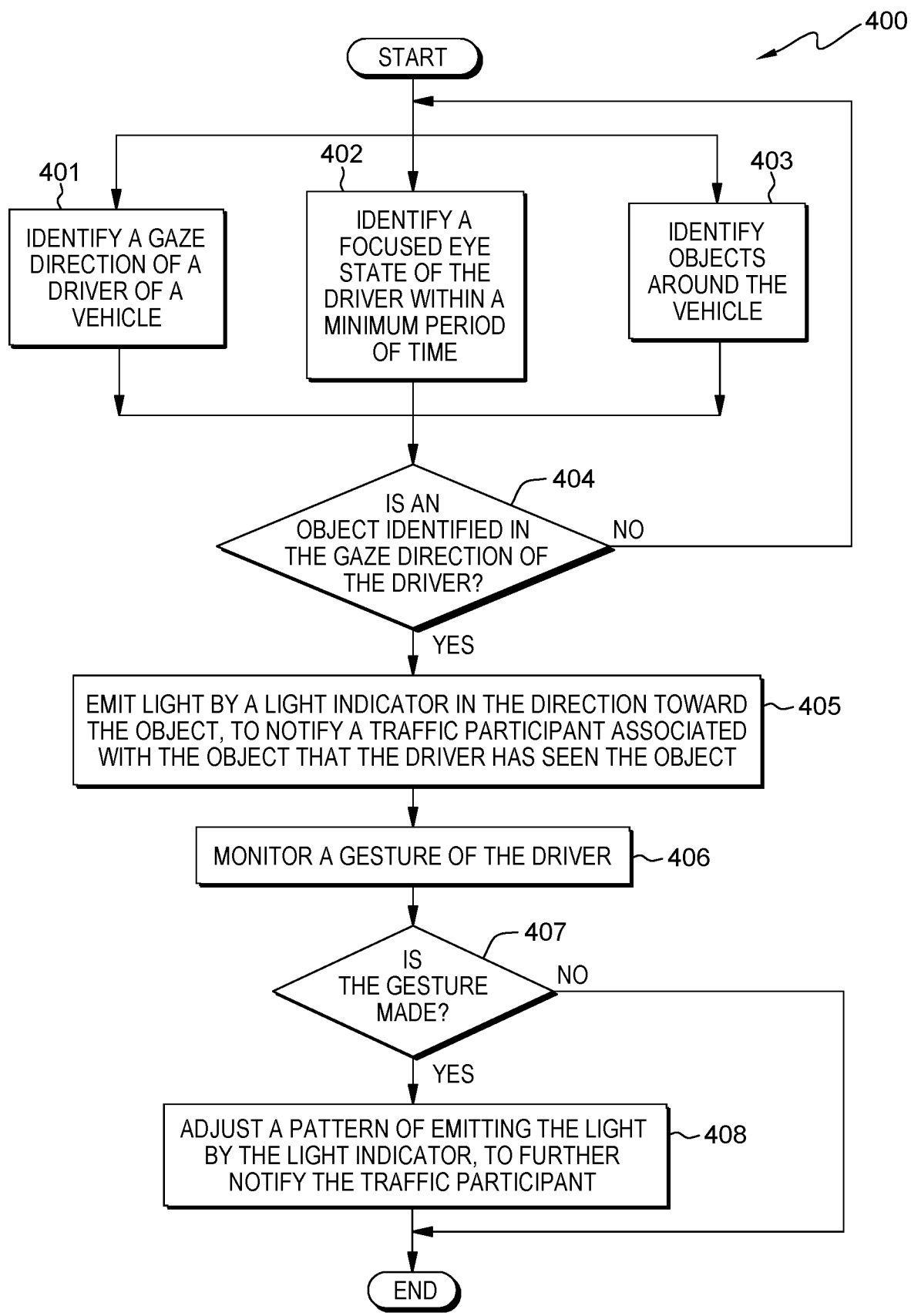
FIG. 4 presents a flowchart showing operational steps of sensor-based acknowledgments between traffic participants, in accordance with one embodiment of the present invention.

FIG. 4 presents flowchart 400 showing operational steps of sensor-based acknowledgments between traffic participants, in accordance with one embodiment of the present invention. The operational steps are implemented by a system of sensor-based acknowledgments between traffic participants. Examples of the system is described in previous paragraphs with reference to FIG. 1, FIG. 2, and FIG. 3. The system includes one or more cameras on a vehicle; the one or more cameras detect eyes of a driver of the vehicle and identify a gaze direction of the driver. The system further includes one or more object recognition sensors on the vehicle, and the one or more object recognition sensors on the vehicle detect and identify objects around the vehicle. The system further includes one or more light indicators which are located on the top and/or around the vehicle's exterior and can emit light. In the system of sensor-based acknowledgments between traffic participants (e.g., system 100 shown in FIG. 1), the one or more cameras, the one or more object recognition sensors, and the one or more light indicators communicate with a computer system on the vehicle. The one or more cameras, the one or more object recognition sensors, and the one or more light indicators are controlled by the computer system on the vehicle; the computer system sends computing program instructions to the one or more cameras, the one or more object recognition sensors, and the one or more light indicators.

At step 401, one or more cameras identify a gaze direction of a driver of a vehicle. In the examples shown in FIG. 1, FIG. 2, and FIG. 3, cameras 101-1, 101-2, 101-3, and 101-4 on vehicle 105 detect eyes of driver 104 of vehicle 105 and identify a gaze direction of driver 104 of vehicle 105. The one or more cameras may be located on a dashboard in front of the driver or surrounding a backup camera's display. The one or more cameras identify the gaze direction by using triangulation. At step 402, the one or more cameras identify a focused eye state of the driver within a minimum period of time. The one or more cameras use pupil dilation and socket movements of the driver to identify when the driver fixates on any object. In the examples shown in FIG. 1, FIG. 2, and FIG. 3, cameras 101-1, 101-2, 101-3, and 101-4 on vehicle 105 identify the focused eye state of driver 104 of vehicle 105. At step 403, one or more object recognition sensors on the vehicle identify objects around the vehicle. The one or more object recognition sensors may be cameras, LIDAR (Light Detection and Ranging), or RADAR (Radio Detection and Ranging). In the examples shown in FIG. 1, FIG. 2, and FIG. 3, sensors 102-1 and 102-2 on vehicle 105 identify objects around vehicle 105. In some embodiments, steps 401, 402, and 403 are processed essentially at the same time.

At step 404, the computer system determines whether an object is identified in the gaze direction of the driver at the moment the driver fixates on the object. In response to determining that, at the moment the driver fixates on the object, the object is not identified in the gaze direction of the driver (NO branch of block 404), the computer system reiterates steps 401, 402, and 403.

In response to determining that, at the moment the driver fixates on the object, the object is identified in the gaze direction of the driver (YES branch of block 404), at step 405, a light indicator emits light in a direction toward the object. The light indicator is one of one or more light indicators that are located on the top and/or around the vehicle's exterior and it is located toward the object. Emitting light from the light indicator notifies a traffic participant associated with the object that the driver has seen the object and/or traffic participant. In the example shown in FIG. 2, light indicator 103-2 emits light in the direction toward the object—vehicle 201, and it notifies drive 202 that driver 104 has seen vehicle 201. In the example shown in FIG. 3, light indicator 103-1 emits light in the direction toward the object—cyclist 301, and it notifies cyclist 310 that driver 104 has seen cyclist 301.

At step 406, the one or more cameras monitor a gesture of the driver while the driver still focuses on the object. The gesture may be a nod, waving a hand, or other identified gestures of the driver. In the examples shown in FIG. 1, FIG. 2, and FIG. 3, cameras 101-1, 101-2, 101-3, and 101-4 on vehicle 105 monitor the gesture of driver 104.

At step 407, the computer system determines whether the gesture is made. In response to the gesture being made (YES branch of block 407), at step 408, the computer system adjusts a pattern of emitting the light by the light indicator. For example, the pattern of the light indicator is changed to an intermittent flashing. Changing the pattern gives the traffic participant associated with the object a further notification that the object has been seen by the driver. In the example shown in FIG. 2, a pattern of emitting light by light indicator 103-2 is changed. In the example shown in FIG. 3, a pattern of emitting light by light indicator 103-1 is changed. In response to the gesture being not made (NO branch of block 407), the computer system skip step 408. In another embodiment, after step 405, the computer system may receive an input from the driver and then adjusts a pattern of emitting the light by the light indicator.

Figure 5:
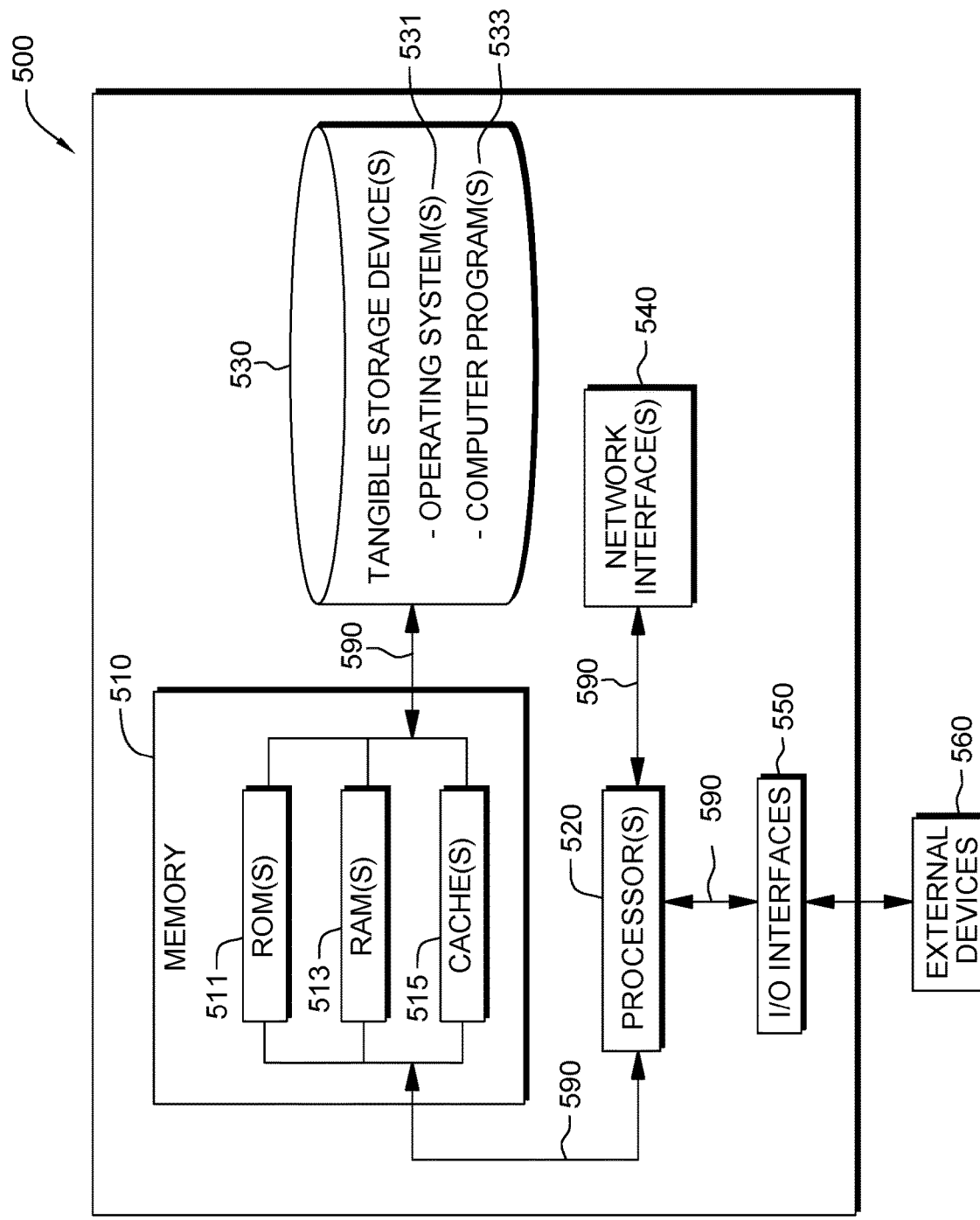
FIG. 5 is a diagram illustrating components of a computer system in the system (shown in FIG. 1) of sensor-based

FIG. 5 is a diagram illustrating components of computer system 500 in system 100 of sensor-based acknowledgments between traffic participants, in accordance with one embodiment of the present invention. It should be appreciated that FIG. 5 provides only an illustration of one implementation and does not imply any limitations with regard to the environment in which different embodiments may be implemented.

Referring to FIG. 5, computer system 500 includes processor(s) 520, memory 510, and tangible storage device(s) 530. In FIG. 5, communications among the above-mentioned components of computer system 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computer system 500 further includes I/O interface(s) 550. I/O interface(s) 550 allows for input and output of data with external device(s) 560 that may be connected to computer system 500. Computer system 500 further includes network interface(s) 540 for communications between computer system 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   instructing, by a computer system on a vehicle, one or more cameras on a vehicle to identify a gaze direction of a driver of the vehicle;
   instructing, by the computer system, the one or more cameras to identify a focused eye state of the driver;
   instructing, by the computer system, one or more object recognition sensors on the vehicle to identify objects around the vehicle;
   determining, by the computer system, whether an object is identified in the gaze direction;
   in response to the object being identified in the gaze direction, instructing, by the computer system, a light indicator to emit light in a direction toward the object;
   wherein the light indicator notifies a traffic participant associated with the object that the driver has seen the object; and
   wherein the one or more cameras identify the gaze direction by using triangulation, wherein the one or more cameras use pupil dilation and socket movements of the driver to identify the focused eye state of the driver.

2. The computer-implemented method of claim 1, further comprising:
   instructing, by the computer system, the one or more cameras to monitor a gesture of the driver while the driver focuses on the object;
   in response to the gesture being made by the driver, instructing, by the computer system, the light indicator to adjust a pattern of emitting the light; and
   wherein adjusting the pattern further notifies the traffic participant that the driver has seen the object.

3. The computer-implemented method of claim 1, further comprising:
   receiving, by the computer system, an input from the driver;
   in response to receiving the input from the driver, instructing, by the computer system, the light indicator to adjust a pattern of emitting the light; and
   wherein adjusting the pattern further notifies the traffic participant that the driver has seen the object.

4. The computer-implemented method of claim 1, wherein the one or more cameras are located on a dashboard of the vehicle.

5. The computer-implemented method of claim 1, wherein the one or more cameras are located surrounding a display of a backup camera on the vehicle.

6. The computer-implemented method of claim 1, wherein the light indicator is one of light indicators on the vehicle and is toward the object, wherein the light indicators are located around an exterior of the vehicle.

7. A non-transitory computer program product, the computer program product comprising one or more computer-readable tangible storage devices and program instructions stored on at least one of the one or more computer-readable tangible storage devices, the program instructions executable to:
   instruct, by a computer system on a vehicle, one or more cameras on a vehicle to identify a gaze direction of a driver of the vehicle;
   instruct, by the computer system, the one or more cameras to identify a focused eye state of the driver;
   instruct, by the computer system, one or more object recognition sensors on the vehicle to identify objects around the vehicle;
   determine, by the computer system, whether an object is identified in the gaze direction;
   in response to the object being identified in the gaze direction, instruct, by the computer system, a light indicator to emit light in a direction toward the object;
   wherein the light indicator notifies a traffic participant associated with the object that the driver has seen the object; and
   wherein the one or more cameras identify the gaze direction by using triangulation, wherein the one or more cameras use pupil dilation and socket movements of the driver to identify the focused eye state of the driver.

8. The computer program product of claim 7, further comprising the program instructions executable to:
   instruct, by the computer system, the one or more cameras to monitor a gesture of the driver while the driver focuses on the object;
   in response to the gesture being made by the driver, instruct, by the computer system, the light indicator to adjust a pattern of emitting the light; and
   wherein adjusting the pattern further notifies the traffic participant that the driver has seen the object.

9. The computer program product of claim 7, further comprising the program instructions executable to:
   receive, by the computer system, an input from the driver;
   in response to receiving the input from the driver, instruct, by the computer system, the light indicator to adjust a pattern of emitting the light; and
   wherein adjusting the pattern further notifies the traffic participant that the driver has seen the object.

10. The computer program product of claim 7, wherein the one or more cameras are located on a dashboard of the vehicle.

11. The computer program product of claim 7, wherein the one or more cameras are located surrounding a display of a backup camera on the vehicle.

12. The computer program product of claim 7, wherein the light indicator is one of light indicators on the vehicle and is toward the object, wherein the light indicators are located around an exterior of the vehicle.

13. A computer system, the computer system comprising:
one or more processors, one or more computer readable tangible storage devices, and program instructions stored on at least one of the one or more computer readable tangible storage devices for execution by at least one of the one or more processors, the program instructions executable to:
instruct, by the computer system on a vehicle, one or more cameras on a vehicle to identify a gaze direction of a driver of the vehicle;
instruct, by the computer system, the one or more cameras to identify a focused eye state of the driver;
instruct, by the computer system, one or more object recognition sensors on the vehicle to identify objects around the vehicle;
determine, by the computer system, whether an object is identified in the gaze direction;
in response to the object being identified in the gaze direction, instruct, by the computer system, a light indicator to emit light in a direction toward the object;
wherein the light indicator notifies a traffic participant associated with the object that the driver has seen the object; and
wherein the one or more cameras identify the gaze direction by using triangulation, wherein the one or more cameras use pupil dilation and socket movements of the driver to identify the focused eye state of the driver.

14. The computer system of claim 13, further comprising the program instructions executable to:
instruct, by the computer system, the one or more cameras to monitor a gesture of the driver while the driver focuses on the object;
in response to the gesture being made by the driver, instruct, by the computer system, the light indicator to adjust a pattern of emitting the light; and
wherein adjusting the pattern further notifies the traffic participant that the driver has seen the object.

15. The computer system of claim 13, further comprising the program instructions executable to:
receive, by the computer system, an input from the driver;
in response to receiving the input from the driver, instruct, by the computer system, the light indicator to adjust a pattern of emitting the light; and
wherein adjusting the pattern further notifies the traffic participant that the driver has seen the object.

16. The computer system of claim 13, wherein the one or more cameras are located on a dashboard of the vehicle.

17. The computer system of claim 13, wherein the one or more cameras are located surrounding a display of a backup camera on the vehicle.

18. The computer system of claim 13, wherein the light indicator is one of light indicators on the vehicle and is toward the object, wherein the light indicators are located around an exterior of the vehicle.

* * * * *